Feb. 21, 1956 F. M. REEVES 2,735,213
FISHING DEVICE
Filed Feb. 20, 1953
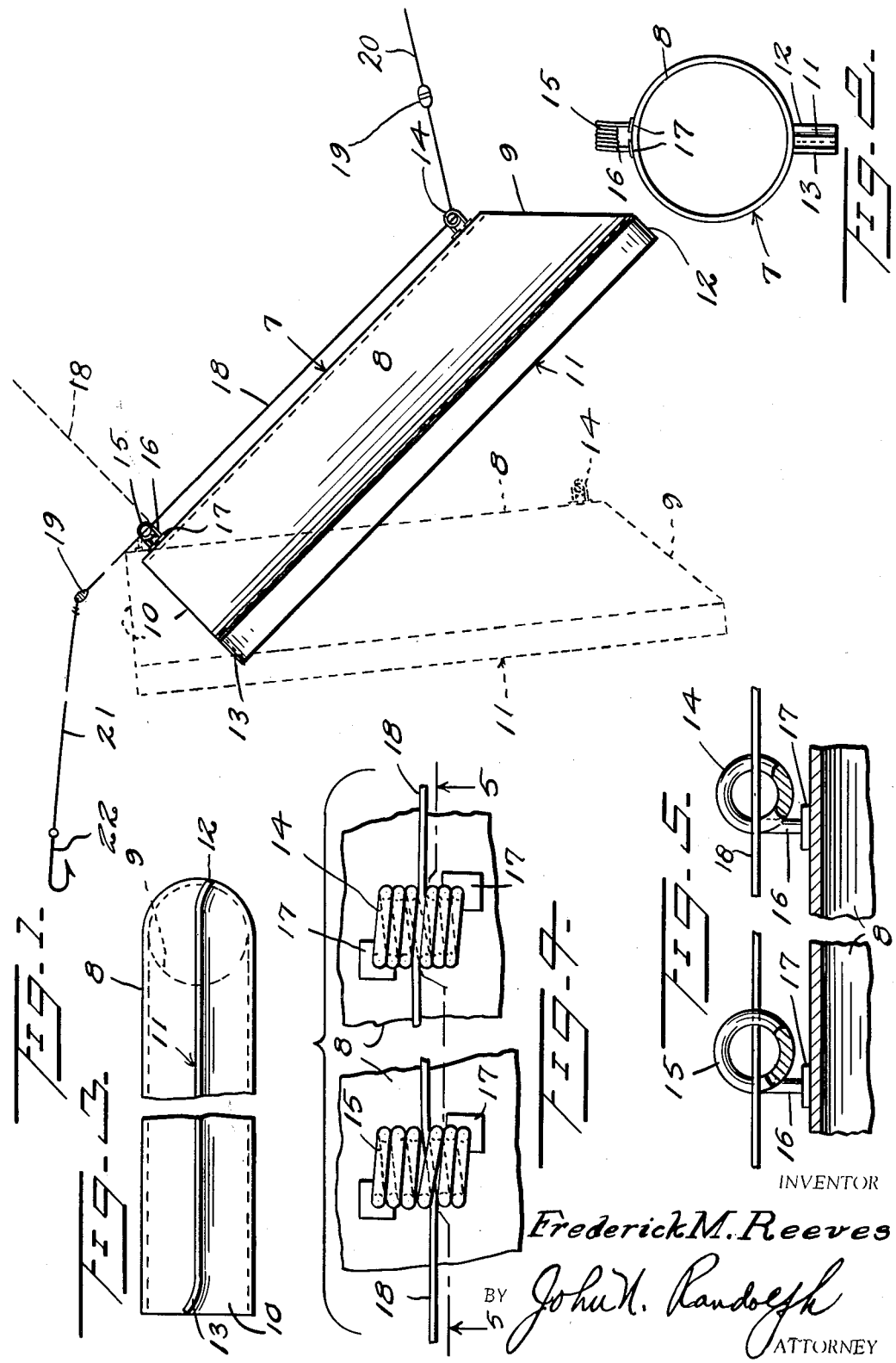
INVENTOR
Frederick M. Reeves
BY John N. Randolph
ATTORNEY

United States Patent Office 2,735,213
Patented Feb. 21, 1956

2,735,213

FISHING DEVICE

Frederick M. Reeves, Tacoma, Wash.

Application February 20, 1953, Serial No. 338,047

2 Claims. (Cl. 43—43.13)

This invention relates to a device for use in fishing and more particularly to a device for use in maintaining a fish lure or bait at a desired depth below the surface of a body of water while trolling or retrieving or while still fishing in a body of water having a current.

More particularly, it is an aim of the present invention to provide a fishing device to replace a conventional sinker which may be readily maneuvered in a sub-surface position for maintaining a lure or bait at a desired depth and for causing the lure or bait to follow an irregular or a zigzag course in its movement through the water to thereby more realistically simulate the natural movements of live bait.

Another object of the invention is to provide a fishing device which may be partially disengaged from a fishing line to enable the device to be more readily retrieved after a fish has been hooked on a lure atached to the device.

Other objects and advantages of the invention will hereinafter become more fully apparent from the following description of the drawing, illustrating a presently preferred embodiment thereof, and wherein:

Figure 1 is a side elevational view showing the fishing device in use;

Figure 2 is a rear elevational view of the fishing device;

Figure 3 is a bottom plan view thereof;

Figure 4 is an enlarged fragmentary top plan view of a part thereof, and

Figure 5 is a fragmentary longitudinal sectional view taken substantially along a plane as indicated by the line 5—5 of Figure 4.

Referring more specifically to the drawing, the fishing device in its entirety is designated generally 7 and includes an elongated hollow cylindrical body portion 8 having an open forward end 9 and an open rear end 10. The open forward end 9 is beveled, as illustrated in Figure 1, so that one longitudinal portion of the body 8 is substantially longer than the diametrically opposite portion thereof. Said longer portion of the body 8 constitutes the bottom thereof and has a strip 11 secured thereto and extending substantially from end-to-end thereof. One longitudinal edge of the strip 11 is suitably secured to the bottom of the cylinder 8 so that said strip depends therefrom to form a keel. The forward and rear end portions 12 and 13, respectively, are bent or flared in opposite directions, as best illustrated in Figure 3.

A pair of coiled springs 14 and 15 are disposed above the top part of the forward and rear ends, respectively, of the cylinder 8 and transversely thereof. Each of said coiled springs includes a plurality of normally abutting convolutions. The ends of each spring provide legs 16 which extend downwardly from the end convolutions, as best seen in Figure 5. The lower ends of the legs 16 are secured to plates 17 which in turn are suitably secured to the upper part of the cylinder 8. The springs 14 and 15, the cylinder 8 and keel 11 are preferably formed of metal or some other material having a specific gravity greater than that of water so that the device 7 is non-buoyant.

A flexible member 18, such as a length of fishing line, has spaced portions secured to the springs 14 and 15. As best illustrated in Figure 4, one portion of the line 18 is gripped or clamped between two intermediate convolutions of the front spring 14 and another portion of the line 18 passes through one of the convolutions of the spring 15 and is gripped by said convolution and the convolution on either side thereof. However, the line 18 may be otherwise secured non-releasably to the spring convolutions 15 while being releasably gripped by the front spring 14. The ends of the line 18 have swivels 19 attached thereto. An end of a fishing line 20 is attached to the swivel 19 on the front end of the line 18 which extends from the front spring 14 and one end of a leader 21 is attached to the swivel 19 of the other, rear end at the line 18. A fishhook 22 is shown attached to the other end of the leader 21 and a natural bait, not shown, is adapted to be attached to the hook 22. The fishhook 22 is only intended to illustrate one form of lure which may be employed and it may be replaced by various forms of buoyant artificial lures such as plugs.

Assuming that a natural bait for fishing is attached to the hook 22 or that a buoyant artificial bait is substituted for the hook 22, when the fishing device 7 is dropped into the water the baited hook 22 will either sink very slowly or will tend to remain on the surface of the water while the device 7 will sink rapidly. Consequently, the baited hook or lure 22 will resist downward movement of the rear end of the device 7. The slacked fishing line 20 will offer only a slight resistance to downward movement of the forward end of the device 7 so that the device 7 will descend nearly vertically with its forward end 9 lowermost until some of the slack is taken up on the line 20 to swing the forward end of the device 7 upwardly to its full line position of Figure 1. During the nearly vertical descent of the device 7, said device will travel in a zigzag course due to the water impinging against the forwardmost faces of the flared keel ends 12 and 13 and this same zigzag movement will thereafter be maintained while the device 7 is drawn through the water at different levels beneath the surface. In trolling or retrieving the device from its full line position of Figure 1, the lines 18 and 20 extend forwardly and upwardly at an angle relative to the axis of the body portion 8 from the front spring 14 when the line 20 is drawn to the right, so that the device 7 will move from left to right of Figure 1. In so moving, water will enter the cylinder 8 through the upwardly and rearwardly inclined forward end 9 thereof and will impinge against the inner side of the bottom portion of the cylinder 8 to tend to deflect the forward end of the cylinder downwardly to maintain the fishing device at a desired depth. By increasing the speed at which the device 7 is trolled or retrieved or by taking in on the fishing line 20, the forward end of the cylinder 8 will be elevated relatively to its rear end to minimize the effectiveness of the water in deflecting the forward end of the device downwardly to thereby cause the device to travel at a lesser depth. Conversely, by slacking off on the line 20 or reducing the trolling or retrieving speed, the forward end of the device 7 will swing downwardly to cause it to travel nearer the bottom. The same effect is accomplished in still fishing in a body of water possessing a current and wherein the more rapid the current the nearer the surface the device 7 will be disposed and wherein the device may be maneuvered to a greater depth by slacking off on the line 20 or to a lesser depth by taken in on the line 20. It will also be apparent that the baited hook or lure 22 will normally be disposed above the level of the upper rear end of the cylinder 8 and will be drawn therebehind in a zigzag course, following the zigzag movement of the device 7.

To facilitate the retrieve after a fish strikes the baited hook or lure 22, a sudden pull on the line 20 will cause the line or flexible member 18 to be jerked out of engagement between the convolutions of the front spring 14, thus releasing the front end of the device 7 from the line 18 so that said forward end 9 will swing downwardly to approximately its dotted line position as seen in Figure 1. The axis of the body portion 8 will then be disposed at an angle of not less than 90° to the line 18 as seen in dotted lines in Figure 1. As thus disposed, the body portion 8 will offer a minimum amount of resistance to retrieving of the lure after the fish has struck, substantially the only resistance being that afforded by the weight of the device 7. Additionally the end 9 will constitute the trailing end of the body 8 when the device 7 is being retrieved, as seen in dotted lines in Figure 1, which constitutes substantially a reversal of the position of the body portion 8 from its position as seen in full lines in Figure 1 and wherein the end 9 constitutes the leading end thereof. The line 18 is engaged nondetachably with the rear spring 15 to prevent loss of the device 7. If preferred, the line 18 can be nondetachably connected to the front spring 14 and disengageably gripped by the rear spring 15 and with only a sufficient engagement so that the pull of the fish will release the line 18 from the rear spring 15 whereby the device 7 will offer only a minimum of resistance to the retrieving of the line for landing the fish.

Various modifications and changes are contemplated and may obviously be resorted to, without departing from the spirit or scope of the invention as hereinafter defined by the appended claims.

I claim as my invention:

1. In combination with a fishing line, a cylinder defining an elongated hollow body member having open forward and rear ends and an unobstructed bore extending between said ends, said cylinder having a bottom portion extending to beyond the forward end of a top portion thereof, the forward end defining a beveled open face, and attaching members secured to and disposed above the top portion and adjacent the ends of the cylinder and to each of which the fishing line is connected, said fishing line extending forwardly and upwardly at an angle from the forward attaching member when the cylinder is pulled by the fishing line through the water with the forward end of the cylinder constituting the leading end thereof, whereby the axis of the cylinder will be disposed at an angle to the fishing line portion extending forwardly from the cylinder such that water will enter the forward end of the cylinder and by impinging against the bottom portion thereof will deflect the forward cylinder end downwardly to produce a diving action of the cylinder and a downward pull on the fishing line, said forward attaching member including means for releasing the fishing line from engagement therewith in response to a sudden jerk on the fishing line so that the cylinder will be connected to the fishing line only by the rear attaching member for free swinging movement relative to the fishing line to assume a position with the axis thereof disposed at an angle of at least 90° relative to the fishing line and with the forward end of the cylinder then disposed as the trailing end thereof so as to offer a minimum of resistance to retrieving the fishing line and cylinder.

2. In combination with a fishing line, a cylinder defining an elongated hollow body member having open forward and rear ends and an unobstructed bore extending between said ends, said cylinder having a bottom portion extending to beyond the forward end of a top portion thereof, the forward end defining a beveled open face, and attaching members secured to and disposed above the top portion and adjacent the ends of the cylinder and to each of which the fishing line is connected, said fishing line extending forwardly and upwardly at an angle from the forward attaching member when the cylinder is pulled by the fishing line through the water with the forward end of the cylinder constituting the leading end thereof, whereby the axis of the cylinder will be disposed at an angle to the fishing line portion extending forwardly from the cylinder such that water will enter the forward end of the cylinder and by impinging against the bottom portion thereof will deflect the forward cylinder end downwardly to produce a diving action of the cylinder and a downward pull on the fishing line, one of said attaching members including means for releasing the fishing line from engagement therewith in response to a sudden jerk on the fishing line so that the cylinder will be connected to the fishing line only by the other attaching member for free swinging movement relative to the fishing line so as to assume a position with the axis of the cylinder more nearly in alignment with the fishing line portion extending upwardly from said cylinder in order that the cylinder will then offer a minimum of resistance to the retrieving of the fishing line.

References Cited in the file of this patent

UNITED STATES PATENTS

| | | |
|---|---|---|
| 188,755 | Redfield | Mar. 27, 1877 |
| 661,100 | Delanoy | Nov. 6, 1900 |
| 1,645,874 | Sanford | Oct. 18, 1927 |
| 1,778,119 | Neville | Oct. 14, 1930 |
| 2,229,239 | Davis | Jan. 21, 1941 |
| 2,482,343 | Ingleton | Sept. 20, 1949 |
| 2,515,103 | Townsend | July 11, 1950 |
| 2,595,947 | Jones | May 6, 1952 |
| 2,608,787 | Krogue | Sept. 2, 1952 |

FOREIGN PATENTS

| | | |
|---|---|---|
| 144,288 | Australia | Nov. 20, 1951 |